United States Patent [19]
Feldbrugge et al.

[11] 3,886,299
[45] May 27, 1975

[54] PROCESS FOR PREPARING MEATLIKE FIBERS

[75] Inventors: Alonzo Feldbrugge, New York, N.Y.; Cynthia Travers, Laurel, Md.; William F. Cloud, Spring Valley; Marshall Rankowitz, Bronx, both of N.Y.

[73] Assignee: General Foods Corporation, White Plains, N.Y.

[22] Filed: Nov. 24, 1972

[21] Appl. No.: 309,301

[52] U.S. Cl. ............... 426/656; 426/448; 426/506; 426/507; 426/802; 426/104 426/657
[51] Int. Cl. ............................................. A23j 3/00
[58] Field of Search ........... 426/364, 448, 350, 506, 426/507, 516, 517

[56] References Cited
UNITED STATES PATENTS

| | | | |
|---|---|---|---|
| 3,142,571 | 7/1964 | McAnelly | 426/141 |
| 3,488,770 | 1/1970 | Atkinson | 426/104 |
| 3,496,858 | 2/1970 | Jenkins | 426/364 |
| 3,684,522 | 8/1972 | Anker et al. | 426/364 X |
| 3,814,823 | 6/1974 | Yang et al. | 426/364 X |

*Primary Examiner*—James R. Hoffman
*Attorney, Agent, or Firm*—Daniel J. Donovan

[57] ABSTRACT

Dense, substantially unpuffed, fibrous products simulating the muscle of animals or the flesh of fish are prepared by feeding a proteinaceous dough through a heated channel of decreasing volume to simultaneously elongate and thermally coagulate the dough and then releasing the compression without forcing the dough through a die while maintaining a pressure drop below 100 psi.

13 Claims, No Drawings

PROCESS FOR PREPARING MEATLIKE FIBERS

BACKGROUND OF THE INVENTION

1. Field of the Invention

The present invention relates to producing food products of fibrous nature and more particularly to a process for preparing dense, heat irreversible, proteinaceous material having a fibrous nature simulating the muscle of animals or flesh of fish.

2. Description of the Prior Art

The food industry for many years has attempted to provide high protein, low cost fibrous proteinaceous material as a substitute for meat. Meat systems in a simplified form have been considered to be comprised of a system of fibers held together by a suitable binder. Thus, synthetic textile fiber technology was applied to the preparation of protein fibers which later may be formed into a single meatlike mass employing a suitable binder. A recent example of binding spun fibers are U.S. Pat. Nos. 3,498,793 and 3,559,561 issued to Page, et al. A protein solution is forced through spinnerettes into an acid bath forming fibers. The spun fibers are then compressed into a solid mass and bound to resemble natural meat products derived from the muscle of animals.

The basic patent giving means of spinning proteinaceous fibers is Boyer, U.S. Pat. No. 2,682,466, issued June 29, 1954. Since then numerous patents have issued using spinnerettes.

While spinning techniques produced satisfactory fibers and when bound acceptable meat products, extensive equipment investment and careful control of processing variables is required with the resulting disadvantage that the final products produced are relatively expensive.

A means of producing fibrous protein without employing spinning techniques is Rusoff, et al., U.S. Pat. No. 3,047,395 issued in 1962. Rusoff discloses rapidly heating a protein slurry, either animal or vegetable, in a finely divided state to a temperature of 300° to 400°F under continuous agitation to cause coagulation of the protein into a fibrous mass. Rapid cooling of the protein results in a shred-like fibrous material which is recovered at rather low yield.

Recent techniques have been devised for producing a low cost, expanded vegetable protein material for use as a meat substitute. Proteins such as soy are subjected to elevated temperature and high pressure and forced through a die to produce an expanded mass or rope of proteinaceous material. The sudden expansion from high pressure to atmospheric pressure causes an expansion in the direction of flow which produces the appearance of fibers. Illustrative of these techniques are Atkinson, U.S. Pat. Nos. 3,480,442 and 3,488,770 and Jenkins, U.S. Pat. No. 3,496,858.

Another technique for forming meatlike products is taught by U.S. Pat. No. 3,102,031 wherein a gluten dough is used in producing an uncooked hamburg-like granule.

The present invention is considered to be an improvement over these prior art patents, particularly those that simulate meat products by expansion through a die from high to low pressure thus producing an expanded product.

SUMMARY OF THE INVENTION

This invention produces low cost, heat-set, fibrous, high protein materials resembling the muscle of animals or flesh of fish. A variety of fiber configurations, simulating natural meat or fish, are prepared by controlling process and formulation variables. These fibrous configurations can be described as short and unaligned, long and unaligned, long and aligned and long, fleshy and aligned. The fibrous proteinaceous material has a more meat-like appearance than offered by current high pressure expanded extrudates and provides a simpler and less costly process than possible employing spun protein and provides much greater yields of fibrous product than obtained by employing a slurry as in Rusoff.

The present invention involves the compression and orientation of a high protein material followed by the simultaneous orientation and coagulation of the material into fibers. The oriented and coagulated protein material is then recovered without being forced through a die. By not employing a pressure drop in forming the fibers, any substantial increase in volume or puffing is minimized. A substantial increase in volume or puffing is an increase in volume of greater than 20 percent.

Orientation and coagulation of the protein is accomplished simultaneously so as to coagulate or heat-set the protein as it is stretched or elongated and formed into a dense, shred-like, continuous fibrous condition. This is accomplished by compressing a dough of heat-settable or coagulable protein in a chamber of decreasing volume, so that the pressure exerted by the reduction in volume forces the dough in a direction of the chamber outlet and simultaneously densifies and presses the dough against a heated surface thereby heat coagulating the protein and forming thermally irreversible fibers as the dough is stretched and/or elongated in a direction toward the outlet of the channel. The irreversible fibrous dough is then recovered without substantial increase in volume. This invention provides a layered, thermally irreversible, fibrous meatlike material without the use of spinning or puffing techniques. If desired the meatlike material may be readily pulled apart into shreds.

While the orientation and heat-setting employed in the present invention is related to principles set forth by Rusoff, et al., the yield of final fibrous material is significantly improved. The product of this invention is a distinct improvement over McAllister, et al. Atkinson or Jenkins in that the proteinaceous material is extremely fibrous in nature resembling that obtained employing spinning techniques, is not puffed as present TVP (Texturized Vegetable Protein) and does not resemble the proteinaceous uncooked granules of McAllister which lack fibrous characteristics.

DETAILED DESCRIPTION OF THE INVENTION

Meatlike fibers of the present invention are prepared by subjecting a moist, heat-settable fiber forming proteinaceous material to simultaneous compression, heat setting and elongation in a chamber of decreasing volume to form a continuous fibrous structure which may be further processed by drying, hydrating or by other art recognized techniques to produce a meat or fish substitute useful in processed foods.

A moist dough of coagulable proteinaceous material is compressed into a unitary body within a chamber of decreasing volume formed by a heated outer wall and an internally rotating screw (auger). volume is reduced within the range 1.0 to 10 X, preferably 1 to 5 X. The pressure exerted by the reduction in volume of the chamber forces a compaction of the protein normal to the channel of the screw aligning the protein in the direction of the channel. Simultaneously, the heated outer wall transfers sufficient heat to the compressed and stretched mass of protein to plasticize the material and heat set the material into a dense fibrous mass which is ejected from the chamber. The heat set material is ejected without a substantial increase in volume over that present in the channel just prior to ejection. The clearance between the heated surface, normally cylindrical or conical in nature, and the rotating screw is adjusted to minimize back-mixing of the proteinaceous material and to quickly heat throughout, stretch and orient the proteinaceous mass in a direction parallel to the auger channel.

Pressure is necessary to compact the proteinaceous material to a point where it is substantially free of voids and to ensure rapid heat transfer, by conduction, from the heated surface to the proteinaceous material. The pressure is maintained at the minimum amount necessary to accomplish compression and to force the material through the chamber of reduced volume since excessive back pressure disrupts the oriented proteinaceous mass and destroys the fiber condition of the protein. Dies normally employed to develop back pressure sufficient to cause expansion of the extrudate, to a region of lower pressure, are not employed in the process of this invention since disruption of the oriented mass would occur.

The chamber surface also provides a frictional resistance to the flow of proteinaceous material which causes stretching or elongation of the material in the direction of the screw channel thus forming a dense, layered, continuous fibrous product. As the fibrous nature of the protein is developed, the heat transferred from the heated surface irreversibly sets the protein into a fibrous mass. The product issuing from the chamber is preferably recovered avoiding pressure drop of any kind thus ensuring that back pressures, other than the resistance of the heated wall and screw do not cause disruption of the oriented or fibrous nature of the protein. Conventional dies employed for puffing are not employed but where shaping is desired a constriction of the type disclosed by Page, et al., U.S. Pat. No. 3,559,561, can be employed to shape the material while minimizing puffing and disruption of the fibers. The pressure drop to atmosphere from the greatest pressure developed in the mass compressed by the rotating auger and the wall should be minimized to limit expansion or puffing to 20 percent or less, preferably to 10 percent or less and preferably below 5 percent volume increase. Pressure drops well below 100 psi are typical.

The thermally irreversible, dense, layered, fibrous protein material once discharged from the chamber may be dried, hydrated, or further cooked by any number of art recognized procedures. The product is useful for foods such as a substitute for meat or fish.

The protein material employed in this invention must have several critical properties. It must contain a minimum percentage of undenatured protein, that is protein that has neither been heat-treated nor otherwise processed to the point where it is no longer coagulable. The protein must also be capable of forming a dough (particulate or not) which can be stretched and pulled or elongated into a fibrous structure.

The concentration of the protein necessary for fiber formation will vary according to the quality and source of the protein. Raw meat, fish and vegetable protein materials can be employed. Suitable vegetable protein sources are soy bean meal, peanut meal, cottonseed or other vegetable protein materials generally recovered as by-products from oil extraction. Full fat proteinaceous sources may be employed but concentrated sources of the protein material are preferred to maximize the protein content of the dough. The muscle of animals, flesh of fish, soy isolate, gluten, albumen, dairy products such as dry milk powder, whey and the like, wheat flour and other protein sources are useful. Cheap meat, poultry or fish not having utility for direct sale to consumers such as poultry paste recovered from laying chickens are a preferred source of animal protein. Proteins such as protein isolates, defatted soy flour and particularly wheat gluten are preferred vegetable derived proteinaceous sources.

Proteinaceous materials are sub-divided (preferably flours of these materials are employed) and mixed to form a moist dough having a moisture content of between 20 percent to 65 percent water, as is basis. Flours having a particle size 80 mesh or finer, are particularly good for forming a uniform initial dough. Where meat materials are employed, it is necessary to partially dehydrate the meat by known drying methods or mix the meat with dry vegetable protein sources of other materials, to reduce the moisture content required for processing. Of course, heat treatment on drying of meat or fish will cause denaturization and therefore, it is preferred to employ meat only as an additive or supplementary source of protein to dry vegetable protein which will comprise a major portion of the dough.

Gluten is the preferred vegetable-derived protein. It is generally preferred to employ a minimum concentration in the dry mix of about 20 percent to a maximum of about 75 percent wheat gluten. The upper limit is dictated by the inability to mix compositions containing a greater amount of gluten while the lower concentration has been found to produce little fiber formation in the absence of other heat coagulable proteins. The lower levels of gluten or no gluten at all may be employed provided the dry weight basis of fiber forming, heat coagulable protein is maintained above 35 percent by weight (dry basis) of the dough.

Oil seed flakes are not employed in the process of this invention. We have found that flakes or coarsely ground oil seed can appear in the final heat treated product in its original particulate form thus detracting from the fibrous character of the product. While some carry through is evident when soy grits are employed (Soyabits) the grits produce an acceptable product. It is preferred, however, to employ protein flours having a particle size less than 80 mesh. Furthermore, while water soluble protein (WSP) or nitrogen solubility index (NSI) of the protein can range from 25 to 85, we prefer to employ protein, particularly soy having an NSI of 50 or above, preferably 60 – 75.

Other materials may be mixed with the proteins. For example, carbohydrates such as starch fillers, colors, fats and other flavoring ingredients may be added to the proteinaceous material. Wheat flour has been found to be an extremely useful additive since it provides some gluten useful in fiber development and is readily cooked and gelatinized during the process to produce a desirable flavor and texture in the product. However, defatted soy bean flour also provides sufficient carbohydrates and a better protein value in the finished product.

The proteinaceous materials, fillers, and other additives are mixed with water to form a dough. The ingredients should be mixed in a heavy duty mixer such that at least some fibers are visually apparent when the dough is pulled. The dough can be a single mass such as that produced in the pastry art or can be particulate such as that produced in the pasta art but in all cases must exhibit a fibrous nature. The moisture content of the dough may vary within limits of from 20 percent to 65 percent by weight but preferably is maintained at about 25 percent to 49 percent by weight for doughs containing a major amount of vegetable protein.

It is important to mix the material with water sufficient to as uniformly as possible distribute the water in the proteinaceous material.

Close inspection of the mixed material reveals a fibrous content in the dough which is a clear indication that the particular dough is capable of forming fibers within the extruder. The mixing time necessary to form the fibrous dough is not critical provided fibers are present when the dough is stretched.

The fibers are further developed and set by subjecting the moist fibrous proteinaceous dough to compression in a chamber of decreasing volume formed by a heated outer wall and rotating screw such that the pressure exerted by the reduction in volume as the outlet of the chamber is approached has densified the dough but does not cause substantial expansion. The compression forces the dough into a dense unitary body conforming to the chamber formed between the screw and the wall. The compression removes voids, expels air and forms a dense proteinaceous mass. Simultaneously, the compression against the heated outer wall allows rapid heat transfer into the mass plasticizing the mass as it is forced towards the outlet of the extruder. The continuous turning of the screw, the resistance of the heated wall and the volume reduction cause a stretching of the plastic mass forming a fibrous texture which is usually aligned in the direction of the channel of the screw and simultaneously the fibers are heated to the point of forming a heat irreversible proteinaceous mass. The fibers are thus simultaneously stretched and oriented in layers or planes normal to the heated surface. The heat set fibers are then expelled from the extruder without puffing to retain the dense meatlike structure formed within the extruder.

Formation of the fibers is conveniently done by feeding a premixed dough to an extruder of the type normally employed in the plastics industry having a minimum clearance between the periphery of the screw and the heated wall and preferably having a minimum clearance between the base of the channel formed by the flights of the screw and the heated wall. By this design, the heat transfer surface area to volume of the protein mass being treated as maximized. The extruder should be designed to provide a reduction in volume from feed to discharge in the screw channel, of from 1 to 10 fold, preferably 1 to 5 fold.

The wall is normally heated to a temperature of at least 250°F and preferably to an average temperature of 280°F or greater. It is preferred to employ multiple zones of heat to provide proper temperature control throughout the barrel of the extruder. Thus the first zone near the inlet of the extruder may be heated to at least 250°F and then one or more zones closer to the outlet may be heated to a temperature of 280°F or greater. The heated surface cooks the carbohydrate content of the dough and raises the temperature of the dough to a point where the protein coagulates. Simultaneously, the screw rotating in relationship to the heated wall causes a stretching effect aligning the material within the screw channel as the protein is being coagulated. The rotating screw and heated wall is closely aligned to limit slippage or backmixing during stretching and coagulation of the fibers.

The minimum speed of screw rotation is determined by the speed necessary for a given extruder to prevent charring or browning of the proteinaceous material as it is being treated. The exact operating conditions are not critical provided sufficient reduction in volume is available to insure proper compression to a dense mass, stretching and coagulation of the protein. If desired, the screw of the extruder may be heated to further increase the surface area present for a given mass of proteinaceous material, and may be further designed to provide a first mixing stage wherein the temperature of the proteinaceous mass is increased to a point incipient to coagulation whereupon the screw is designed to provide a reduction in volume to compress, elongate and orient the protein during coagulation. The first mixing stage may also be employed to mix ingredients and form the fibrous dough. Thus large amounts of material may be mixed initially in deep flights in a screw and upon formation of the dough and reaching coagulation temperature the volume of the screw channel reduced to maximize the heated surface to mass relationship during elongation and coagulation of the protein.

We have found that the reduction in volume within the extruder has an appreciable effect on the kind of fiber produced. As the volume in the channel is decreased, longer, stringier fibers are developed. In extruding a given formulation, such as used in Example I, a 2:1 reduction in volume gives a fibrous fleshy meat-like strip having more tissue layers whereas a 5:1 reduction in volume gives a material with fewer layers but having longer fibers.

The total moisture content of the dough entering the extruder (as is) may vary from about 20 percent to about 65 percent water. We have found that higher moistures, usually around 45 percent are useful in preparing a fish-like texture having relatively short unaligned fibers. It is believed that the high moisture content allows greater mixing of the plastic mass during coagulation and dilutes the protein content of the dough sufficiently to reduce the degree of stretching and alignment of the fibers during coagulation. A good seafood texture is obtained employing a dough containing about 20 – 45 percent wheat gluten and about 38 – 49 percent water processed at a temperature of about 275° to 325°F using a IX reduction in volume during coagulation. The fiber length is increased by using higher amounts of wheat gluten and higher temperatures within the preceding range without orienting the fibers.

To prepare an aligned, fibrous protein, a dough consisting of wheat gluten levels of 45 – 70 percent (dry basis); 25 – 38 percent water is processed at temperatures of 275° to 390°F using screw volume reduction of about 1 to 5X. Decreasing the volume reduction of the screw, within the preceding range, provides a fleshy, aligned, fibrous product, while increasing the volume reduction provides a long, stringy, fibrous product. These aligned structures are most applicable in simulating naturally existing meat-type muscle structures.

The dense product, prepared by the process of our invention, is substantially unpuffed (less than 10 percent and preferably less than 5 percent volume change on issuing from the extruder) although surface and internal bubbles may be present and are believed to be caused by evaporation of water. Absolute density measurements made by weighing texturized protein, incorporating this protein in 250 ml of purified sand and measuring the displacement of sand has indicated that commercially available TVP such as Texgran (Swift) has a density of 0.5 g/cc whereas our product, prepared as in Examples I and VIII, have densities of 0.8 and 0.6 g/cc, respectively.

The following examples are illustrative of this invention, but not intended to limit it. In all cases illustrated by the Examples, the extruders were run without a die or torpedo to prevent puffing and disruption of the product.

EXAMPLE I

A mixture of wheat gluten (60 percent), ground soy grits (25 percent), wheat flour (12.6 percent), ammonium carbonate (0.4 percent) and salt (2 percent) was dry blended, and an amount of water equal to 30 percent of the final weight of the mix was added. The total mix was blended in a Sigma mixer for 20 minutes. The blend was then force fed into a ¾ inch Brabender laboratory extruder having a 25:1 L:D ratio screw. The die section and torpedo was removed to prevent pressure drop causing a volume change or disrupting the continuous aligned fibrous product. The extruder barrel consists of three heating zones with barrel temperatures of 244°F, 310°F and 330°F from inlet to outlet, respectively. The 2/1 screw, producing a 2:1 2:1 (1X) volume reduction within the extruder, was rotated at 40 RPM. Dough at 55°F entering the extruder, remained therein for approximately 55 seconds and exited at 255°F (29 gms/min at 17 percent moisture). The exiting product was a long continuous substantially unpuffed ribbon with a fibrous, aligned texture. Upon hydration in boiling water, the product resembled strips or shreds of chicken, pork or veal.

EXAMPLE II

Example I was repeated except ammonium carbonate was removed from the formulation. The resulting product on rehydration was found to be fibrous and meatlike.

EXAMPLE III

A formulation containing a 20 percent wheat gluten, 65 percent soy grits, 12.6 percent wheat flour, 2.4 percent salt, all on a dry basis, was mixed with water to form a dough of 30 percent moisture and processed as in Example I. A continuous strip of product was obtained which on hydration had visible meatlike fibers present.

EXAMPLE IV

The dry blend was prepared of 60 percent soy isolate (Promine D), 25 percent ground soy grits and 15 percent wheat flour. Sufficient water was added to the blend to prepare a 35 percent moisture dough which was mixed in a Sigma blade mixer for 20 minutes. The dough was extruded employing the extruder used in Example I using a 5 to 1 screw operating at 70 RPM. The dough was fed to the extruder at 70°F and the heating zones on the extruder were set at 290°F, 300°F and 310°F from feed to discharge, respectively. A continuous strip of material was produced with a pressure at the discharge of the extruder less than 150 PSI. On rehydration, the product was found to be fibrous resembling chicken skin.

EXAMPLE V

A dough was prepared in a Sigma blade mixer composed of 33 percent chicken solids derived from old egg-laying hens, 50 percent wheat gluten, 11 percent ground soy grits and 6 percent wheat flour. The chicken solids are commercially available in frozen form and contain 67 percent moisture which was sufficient with the other dry ingredients to produce a final dough of 40 percent moisture. The frozen chicken solids were chopped into small chunks and placed in a Sigma mixer and mixed with the dry ingredients for 25 minutes. The resulting dough was extruded using a 2 to 1 ratio screw at 70 RPM. Uniform zone temperatures of 300°F were employed. A continuous strip of material was obtained which was uniform, evenly cooked and highly fibrous resembling chicken meat when rehydrated.

EXAMPLE VI

Frozen chicken slurry 33 percent solids was freeze-dried, in a laboratory dryer for 6 hours to a moisture content of 39 percent. The freeze-dried chicken was then extruded in the equipment employed for Example I using a 2 to 1 screw and an RPM of 80 to 100. Product was recycled during extrusion to increase the temperature until there was obtained a strip of very fibrous material in nature but with little fiber alignment due to recycling.

EXAMPLE VII

Chicken slurry prepared from ground laying hens was kneaded with wheat flour to produce on a dry basis a composition of 54 percent wheat flour, 46 percent chicken solids having a moisture content of 45 percent. The mixture was extruded using a ¾ inch Brabender extruder as in Example I. The 2/1 screw was rotated at 90 RPM. The barrel temperature profile was maintained at 290°F producing a fibrous partially aligned meatlike product.

EXAMPLE VIII

To 67 parts of defatted soy flour (60–75 NSI) was added 33 parts of water in a Sigma blade mixer. The material was mixed for 20 minutes resulting in a particulate dough having a fibrous character. The dough was force fed to the Brabender extruder employed in Example I. The dough was transferred through the extruder employing a 4:1 screw turning at 60 RPM. The temperature of the extruder barrel was maintained at 300°F at the inlet and 325°F at the outlet of the extruder. The extruded product was fibrous. When hydrated the extrudate had the appearance of veal.

EXAMPLE IX

A dry blend similar to Example I was prepared. To the dry blend was added an amount of water equal to 45 percent by weight of the resulting mixture. The dry blend and water was mixed in a Sigma mixer for 20 minutes The resulting fibrous dough was extruded as in Example I employing a 2:1 screw turning at 50 RPM. Dough entering at 70°F and passed through the extruder heated at 300°F and exited as a continuous strip of product having a stringy unaligned fibrous texture with the appearance of crabmeat.

EXAMPLE X

Dehydrated meat meal (slaughter house scrap) at a level of 40 percent was blended with 45 percent wheat gluten and 15 percent defatted soy flour and mixed with sufficient water to bring the final dough moisture to 30 percent. This dough was processed as in Example I using a 2:1 screw at 60 RPM and a 280°F barrel temperature profile. The final product, upon hydration, was aligned, fibrous, and dense, and resembled a much superior portion of meat (pot roast). This textural upgrading of inexpensive meat meals provides an improved form for use in animal foods (i.e., dog and cat foods).

EXAMPLE XI

The formulation employed in Example I was formed into a dough of 35 percent H₂O as is. The dough (fibrous when pulled) was frozen and chopped into small pieces in a Fitspatrick Mill for convience in feeding a Model TM 25/35-24 Prodex Extruder manufactured by HPM Division of the Kochring Co. A screw, 2½ inch diameter, having a 24/1 L/D was employed at 22 RPM. The volume reduction in the center flights of the screw was 4:1. The auger contained 4 constant volume, inlet flights, 10 flights reducing volume 4:1 and 10 constant volume, outlet flights. Channel depth was 0.48 inches for the inlet flights and 0.12 inches for the outlet flights. The barrel of the extruded was heated to 320°F at the inlet with the remaining sections heated to 350°F, 335°F and 340°F respectively. The frozen formulation was processed at approximately 150 lbs/hr and yielded a substantially unpuffed, continuous, highly aligned, fibrous product closely resembling the product of Example I and II. Actual thickness of the strip was measured as 0.125 inches whereas theoretically was 0.12 inches based on the depth of the outlet flights. This represents less than 5 percent increase in volume.

From the preceding specific embodiments of the present invention, numerous modifications and alterations will be apparent to those skilled in the art, and it is intended that these be included within the scope of the present invention.

What is claimed is:

1. A process for preparing a substantially unpuffed fibrous product simulating the muscle of animals or flesh of fish comprising:

a. preparing a mixture containing above 35 percent by weight heat coagulable protein;
    b. adjusting the moisture content of the mixture to 25 – 65 percent;
    c. blending the mixture to form a dough having a fibrous character when stretched;
    d. compressing the dough in a chamber formed by the channel of a screw rotating within an outer wall heated to at least 250°F wherein the volume of the channel between flights of the screw is decreased 2/1 or more from feed to discharge of the chamber to degas and densify the dough into a unitary body whereby said dough is
        simultaneously heated and elongated while under compression to a heat set, thermally coagulated fibrous product, having fiber alignment in the direction of the channel;
    e. releasing the compression on the product without forcing the product through a die while maintaining a pressure drop below 100 psi thereby causing 20 percent or less puffing of the product and while maintaining the aligned fibrous condition of the product; and
    f. recovering the fibrous product.

2. The process of claim 1 in which the heat coagulable protein includes defatted soy bean.

3. The process of claim 1 in which the heat coagulable protein includes gluten.

4. The process of claim 1 in which the heat coagulable protein includes animal protein.

5. The process of claim 1 in which the mixture contains a major amount of vegetable protein and wherein the moisture content of the dough is about 25 to 49 percent by weight.

6. The process of claim 1 in which the temperature of the heated wall is 280°F or greater.

7. The process of claim 6 in which the release of compression does not increase the product volume by more than 10 percent, and the time of heating does not exceed 3 minutes.

8. The process of claim 7 in which the dough contains 20 – 75 percent wheat gluten and soy flour.

9. The process of claim 7 in which the volume increase of the product after compression is less than 5 percent.

10. The process of claim 1 in which the expansion in product volume leaving the chamber is less than 10 percent.

11. The process of claim 1 in which the expansion in product volume leaving the chamber is less than 5 percent.

12. The process of claim 1 in which the protein dough contains a major amount of vegetable protein.

13. The process of claim 1 in which the protein dough contains wheat flour.

* * * * *